(12) United States Patent
Carlin et al.

(10) Patent No.: US 12,449,073 B1
(45) Date of Patent: Oct. 21, 2025

(54) HYDRONIC PIPE PENETRATION WAVEGUIDE

(71) Applicant: E.K. Fox & Associates, Ltd., Chantilly, VA (US)

(72) Inventors: Steven A. Carlin, Chantilly, VA (US); David R. Pendergraph, Chantilly, VA (US)

( * ) Notice: Subject to any disclaimer, the term of this patent is extended or adjusted under 35 U.S.C. 154(b) by 0 days.

(21) Appl. No.: 18/793,443

(22) Filed: Aug. 2, 2024

(51) Int. Cl.
*F16L 23/036* (2006.01)
*F16L 23/08* (2006.01)
*F16L 23/16* (2006.01)
*F16L 41/08* (2006.01)

(52) U.S. Cl.
CPC ............. *F16L 23/036* (2013.01); *F16L 23/16* (2013.01); *F16L 23/08* (2013.01); *F16L 41/086* (2013.01)

(58) Field of Classification Search
CPC ......... F16L 23/036; F16L 23/16; F16L 23/08; F16L 23/0283; F16L 41/08; F16L 41/086; F16L 41/14; F16L 39/00
See application file for complete search history.

(56) References Cited

U.S. PATENT DOCUMENTS

| 2,338,686 | A | * | 1/1944 | Gredell | F16L 41/086 |
| 3,840,051 | A | * | 10/1974 | Akashi | |
| 5,364,574 | A | * | 11/1994 | Panayappan | |
| 11,781,679 | B2 | * | 10/2023 | Huang | F16L 41/086 |
| 2005/0212296 | A1 | * | 9/2005 | Dole | F16L 23/08 |
| 2005/0253383 | A1 | * | 11/2005 | Gibb | F16L 23/08 |
| 2008/0246277 | A1 | * | 10/2008 | Gallagher | F16L 39/00 |
| 2013/0125373 | A1 | * | 5/2013 | Bancroft | F16L 23/08 |
| 2015/0240843 | A1 | * | 8/2015 | Sawchuk | |
| 2021/0388932 | A1 | * | 12/2021 | Patterson | F16L 41/086 |
| 2024/0125415 | A1 | * | 4/2024 | Cook | F16L 23/0283 |

* cited by examiner

*Primary Examiner* — William S. Choi

(57) ABSTRACT

The current disclosure relates to Hydronic Waveguide pipe penetration assembly. The pipe penetration assembly provides protection from the penetration of EMI and RF emission into a shielded enclosure. The Hydronic Waveguide passes through a wall of the shielded enclosure utilizing a gasket between the wall and the waveguide and is fastened securely utilizing a number of bolts and nuts forming a mechanical fastening to the shielding perimeter. The gasket provides a low-resistance electrical connection from the Hydronic Waveguide assembly and the enclosure shield to mitigate EMI and RF interference and/or penetration.

8 Claims, 5 Drawing Sheets

HYDRONIC PIPE PENETRATION WAVEGUIDE

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

In facilities with electromagnetic interference (EMI) and radio frequency (RF) shielded rooms, equipped with water-cooled or chilled water-cooled terminal devices, fire suppression systems, and plumbing utilities, waveguide feed-throughs are used to transport liquids to prevent EMI/RF emissions across shielded walls. Typical construction of waveguide feed-throughs for hydronic applications consists of a fully threaded, solid brass pipe with parallel pipe threads that is secured to the shielded wall with two mounting nuts on both sides of the wall. Threaded pipe fittings are used at the ends of the waveguide feed-throughs to adapt to the pipe size and connection type required for the terminal devices. For larger-size waveguide feed-throughs, large pipe wrenches and tools are required to tighten the mounting nuts and the pipe fittings, which may be difficult in tight workspaces. The existing technology also requires draining the liquid out of the waveguide feed-throughs and disassembling the piping connections to access the mounting nut if maintenance is required to better seal to the shield wall.

BRIEF DESCRIPTION OF THE DRAWINGS

Certain illustrative embodiments illustrating organization and method of operation, together with objects and advantages may be best understood by reference to the detailed description that follows taken in conjunction with the accompanying drawings in which.

DETAILED DESCRIPTION

Figure 1:
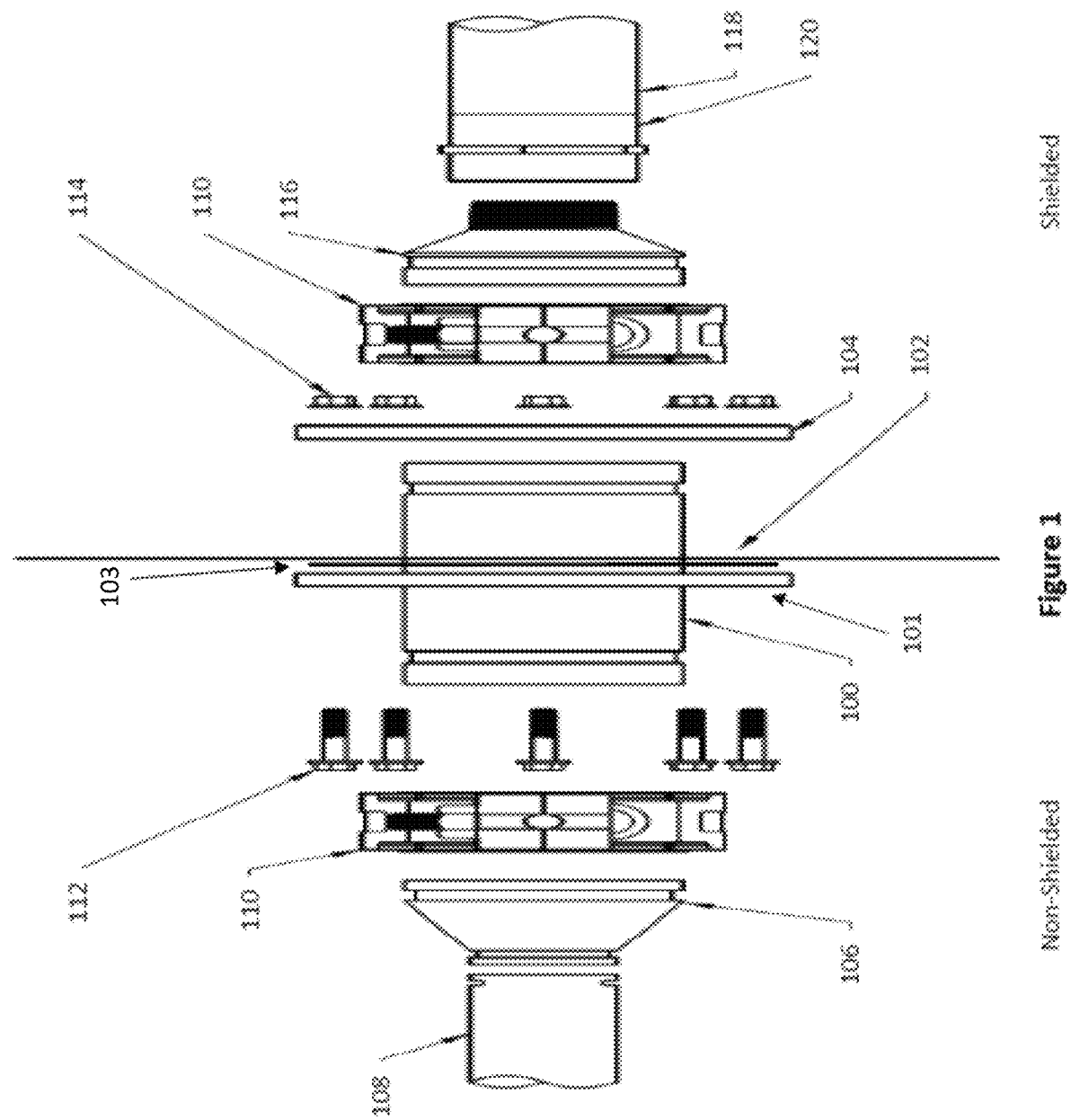
FIG. 1 is a perspective view of a Hydronic Waveguide and wall attachment elements consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one as or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. As used herein, the word "or" is intended to be inclusive.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner in one or more embodiments without limitation.

As used herein, the term "longitudinal axis" means the line running lengthwise through the interlocking glue stick and passing substantially through the center of the interlocking glue stick.

As used herein, the word "lateral" means in a direction perpendicular to the longitudinal axis.

As used herein, the word "side" is means the outer surfaces of the interlocking glue stick which are oriented substantially parallel to the longitudinal axis.

As used herein, the word "end" means the outer surfaces of the interlocking glue stick which are oriented substantially perpendicular to the longitudinal axis.

As used herein the words interlock", "interlocks, and "interlocking" refer to two or more objects that engage with each other by overlapping or by the fitting together of projections and recesses with sufficient contact to resist the breaking of the interlock when a force is applied along the longitudinal axis, permitting the two or more objects to remain in contact.

In an exemplary embodiment, this product provides a scalable, easy to install solution to the challenge of providing chilled water to shielded enclosures. The system is designed to mate with a standard grooved pipe coupling, which eliminate the issues with previous products on the market when the piping diameter of the system is increased above 1". These issues include sealing the combination of NPT and NPS threads, assembly of large NPT fittings (i.e. tool size and access), future maintenance of assembly (the wall attachment does not affect the sealing of the assembly).

A hydronic waveguide is designed to transport water or cooling fluid across the shielded boundary while minimizing or eliminating both EMI and RF emissions from entering a shielded enclosure. The body of the hydronic waveguide coupled with an RF gasket mitigate and/or eliminate the penetration and interference of EMI and RF emissions by preventing EMI and RF emissions from being propagated either through the opening of the hollow body of the hydronic waveguide or the liquid passing through the hydronic waveguide from an unshielded outside environment to a shielded environment. The hydronic waveguide is equipped with a shrink-fitted (fixed) mounting ring that has multiple-bolt mounting pattern, making it easy to install in tight spaces. Both ends of the hydronic waveguide are grooved to make it compatible with standard iron pipe size (IPS) grooved couplers, allowing it to adapt to grooved or threaded piping. The bolted fastening method to the shielded boundary and the grooved ends allows for independent maintenance of the RF/EMI emanation and fluid sealing from either the shielded or unshielded side of the shield wall of a shielded enclosure.

The pipe penetration assembly utilizes a solid brass body, with an array of thru holes not exceeding 3/8" diameter to provide protection of frequencies up to 18 GHz. The brass body of the hydronic waveguide, which is the component that passes through the shield wall of a shielded enclosure, has a mounting ring that is shrink fit onto the outside diameter and provides a means of connection to the existing shielding perimeter. A series of clearance holes are located in the mounting ring and perform the mechanical fastening to the shielding perimeter. A support ring is included that has the same outside diameter as the mounting ring but has a clearance fit, in a non-limiting example, with the main body of the waveguide. An RF gasket is placed between the support ring and the shield wall perimeter. The RF gasket provides a low-resistance electrical connection from the hydronic waveguide and the shielded boundary to help mitigate EMI and RF interferences and/or penetrations into the liquid passing through the hydronic waveguide and the shielded interior of the shielded environment. The support ring is used on the outside of the shield perimeter to support and sandwich the main shielding materials between the support and mounting ring.

The main body of the pipe penetration has a provision for the connection of a grooved pipe fitting and gasket at both ends. The fitting is also provided with a die-cut monel/silicone gasket that is placed between the mounting ring and shielding perimeter during installation. A support ring is used on the outside of the shielding perimeter to support and sandwich the main shielding materials between the support and mounting ring. The support ring is installed on the shielded side of the boundary down with bolts and nuts to fasten the hydronic waveguide to the shielding perimeter. This mounting method allows the hydronic waveguide a tight RF/EMI seal without deforming the shielded wall. This gasket provides the low-resistance electrical connection from the hydronic waveguide assembly and the building shield to help mitigate EMI and EF interference and/or penetration.

In an exemplary embodiment the Hydronic Waveguide is installed by preparing an opening in a shielded wall of a shielded enclosure for the Hydronic Waveguide installation. Both the center hole diameter to accept the waveguide and the bolt pattern associated with the mounting ring must penetrate through the shielded wall of the shielded enclosure. The RF gasket material is then attached to the main body of the Hydronic Waveguide. The Hydronic Waveguide is then installed into the previously prepared shield wall opening. A support ring is than slid onto the opposite side of the waveguide from the gasket material. The fastening bolts are inserted through the holes of the bolt pattern previously prepared and the bolts are fastened to the shield wall using the washers, lock washers, and nuts provided to hold the Hydronic Waveguide securely in place. The bolts are fastened down by providing torque on the bolts in a star pattern to provide for even distribution of the fastening force and prevent warps or misalignment of the bolts. The fluid piping it then connected to the Hydronic Waveguide utilizing a grooved coupling on both the shielded and non-shielded sides of the shield wall.

In an exemplary embodiment, this product was used to successfully deliver chilled water to a set of shielded enclosures while maintaining a 60 dB shielding effectiveness up to 10 GHz. This product in its fundamental design could provide chilled water or other fluid delivery to shielded enclosures or shielded spaces that require protection from EMI/RF emanations. The product is designed to operate under pressures up to 150 psi and the system has been tested up to 200 psi.

In a non-limiting example, the Hydronic Waveguide may be installed in a medical facility, specifically in a space that may emit radiation from equipment installed within that space. The Hydronic Waveguide device may be used to transfer cooling liquids into and out of the space to provide for equipment cooling capability, while limiting the amount of EMI and/or RF radiation that may be transferred to adjacent spaces.

In another non-limiting example, the Hydronic Waveguide may be used in a secure government space that may require restriction of RF and/or EMI radiation. The device may be used to transfer liquids, such as cooling liquids, fire protection liquids, or potable water, as examples, into and out of the space while concurrently limiting the amount of RF and/or EMI radiation that is allowed to enter or exit the space. The device may accommodate different sized piping and may adapt to different end connection types. These adaptations allow for the use in multiple applications within the same space.

Turning now to FIG. 1, this figure presents a perspective view of a Hydronic Waveguide and wall attachment elements consistent with certain embodiments of the present invention. In an exemplary embodiment, the main body of the Hydronic Waveguide 100 penetrates a wall from a non-shielded side of the wall to a shielded side of a wall. A brass mounting ring and RF (Radio Frequency) gasket 103 attached to the face of the brass mounting ring 101 forms a portion of the body of the waveguide such that the RF gasket 103 is between the brass mounting ring and the shield wall of the shielded enclosure. The brass mounting ring and RF gasket 103 encircles the body of the Hydronic Waveguide 100 at the point where the waveguide is applied to and passes through the shield wall 102. The RF gasket 103 installed on the inside face of the brass waveguide mounting ring 101 and a brass support ring 104, when fastened securely together, prevent the passage of RF radiation through the wall at the penetration location of the waveguide. The brass support ring 104 on the shielded side of the wall and a number of Type 8 bolts 112 and equal number of Type 8 mounting nuts 114 secure the hydronic waveguide 100 to the shield wall 102. The Hydronic Waveguide body 100 is attached to a 2-inch steel CHS/CHR pipe 108 on the non-shielded side of the wall and attached to a 2-inch PVC pipe 118 on the shielded side of the wall to facilitate the movement of liquids through the wall through the body of the Hydronic Waveguide 100. The 2-inch steel CHS/CHR pipe 108 is attached through a 4 inch to 2-inch grooved steel reducer 106 to a 4-inch victaulic clamp 110, which then secures the connection of the 2 inch steel CHS/CHR pipe 108 to Hydronic Waveguide body 100 on the non-shielded side of the wall. On the shielded side of the wall the Hydronic Waveguide body 100 is connected to the 2 inch PVC pipe 118 through a 4 inch victaulic clamp 110 fastened to a 4 inch to 2 inch MNPT steel reducer 116 and a 2 inch FNPT to SLIP PVC adapter 120. Once inserted through and secured to the wall the Hydronic Waveguide 100 permits the passage of liquids from a pipe, such as a steel pipe, on the non-secured side of a wall to a pipe, such as a PVC pipe, that delivers the fluids passing through the waveguide at up to 200 psi to the shielded side of a wall while limiting or eliminating the passage of RF and/or EMI radiation through the opening in the wall or being propagated through any fluid.

Figure 2:
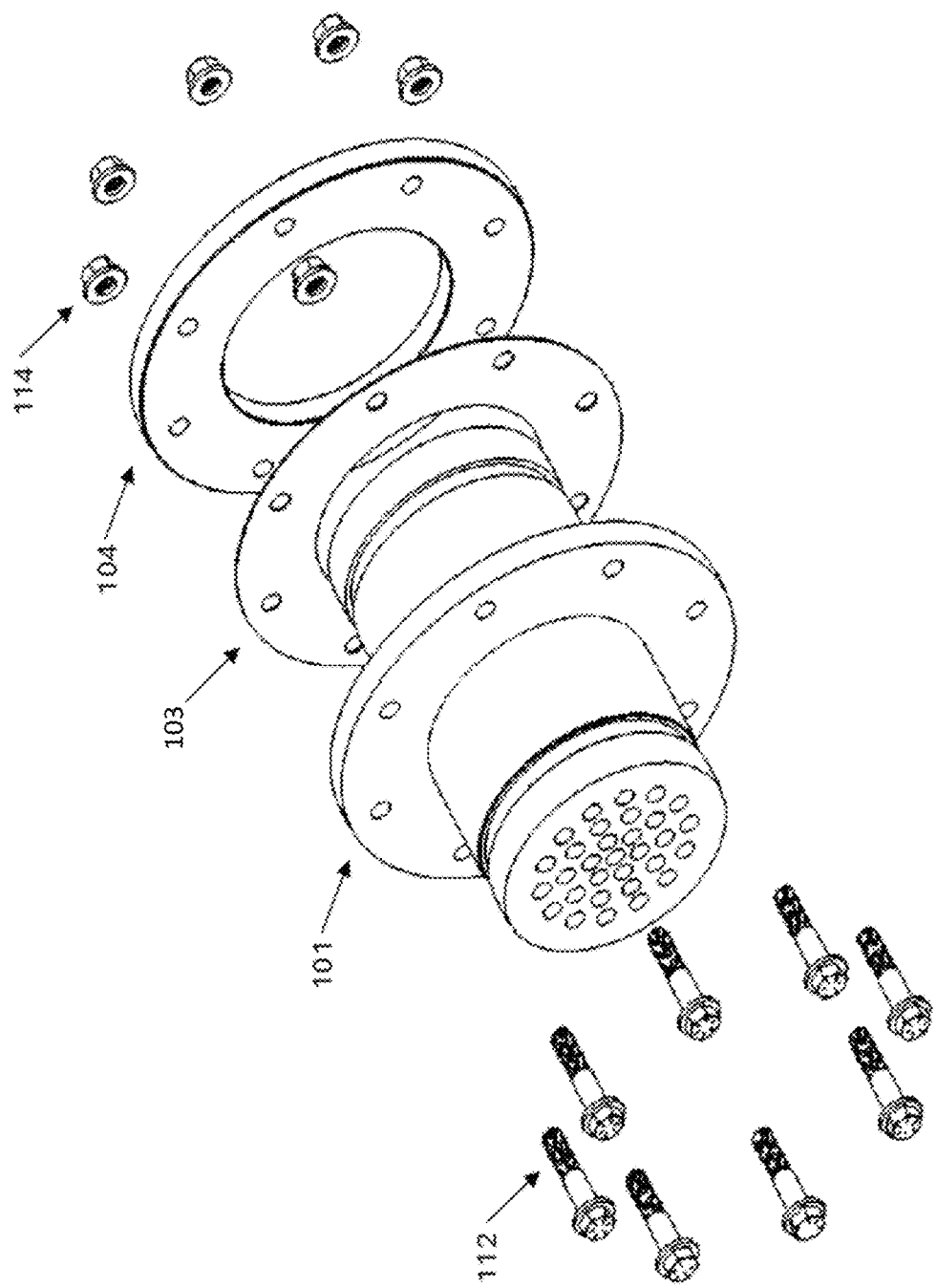
FIG. 2 is an exploded view of the Hydronic Waveguide consistent with certain embodiments of the present invention.

Turning now to FIG. 2, this figure presents an exploded view of the Hydronic Waveguide fastening elements consistent with certain embodiments of the present invention. In an exemplary embodiment, the Hydronic Waveguide is fastened through a wall from an unshielded side to a shielded side by passing the body of the waveguide through the wall from an unshielded side to a shielded side such that the brass mounting ring and RF gasket 103 is placed against the unshielded side of the wall. The brass support ring 104 is then placed over the body of the waveguide until the brass support ring 104 comes into contact with the shielded side of the wall. The brass flange 104 is then securely mounted to the brass mounting ring 101 by passing a plurality of type 8 bolts 112 through the brass mounting ring 101 and through the brass flange 104 and securing them together by attaching and tightening a plurality of Type 8 nuts 114 onto the type 8 bolts. After tightening the nuts 114 onto the bolts 112, the Hydronic Waveguide body is held securely in place as it passes through the shield wall.

Figure 3:
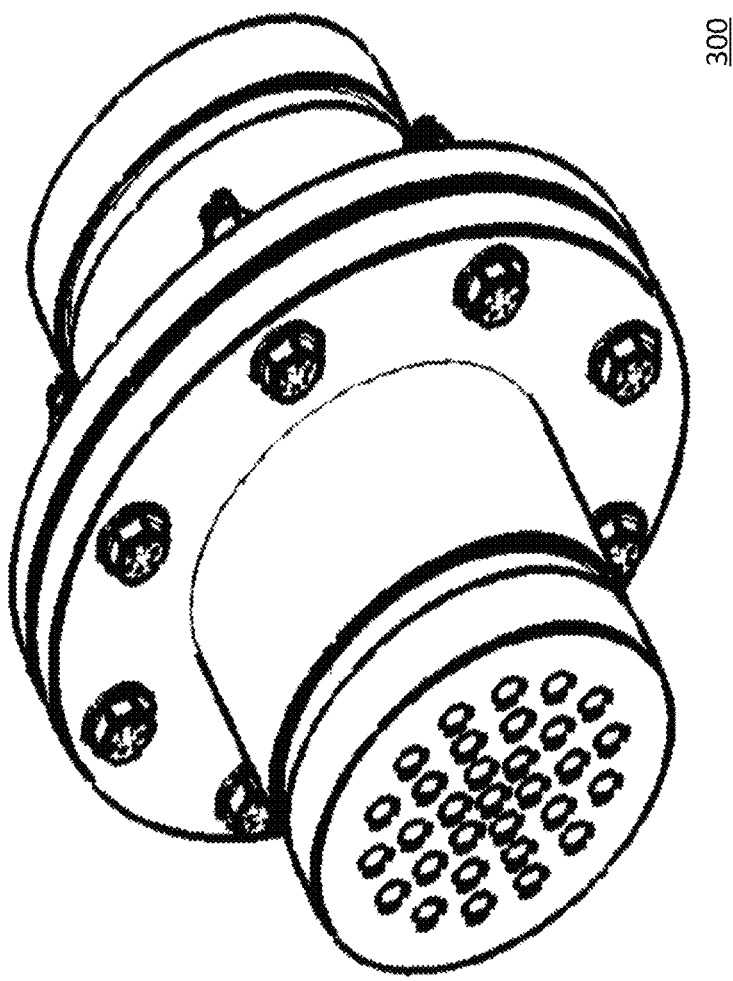
FIG. 3 is a view of a fully assembled Hydronic Waveguide consistent with certain embodiments of the present invention.

Turning now to FIG. 3, this figure presents a view of a fully assembled Hydronic Waveguide consistent with certain embodiments of the present invention. In an exemplary embodiment, the Hydronic Waveguide is securely fastened together at 300 to present a passage way shielding fluids and the shielded environment against EMI and RF penetrations and interference from a non-shielded side of a wall, through the wall, and into a shielded side of a wall.

Figure 4:
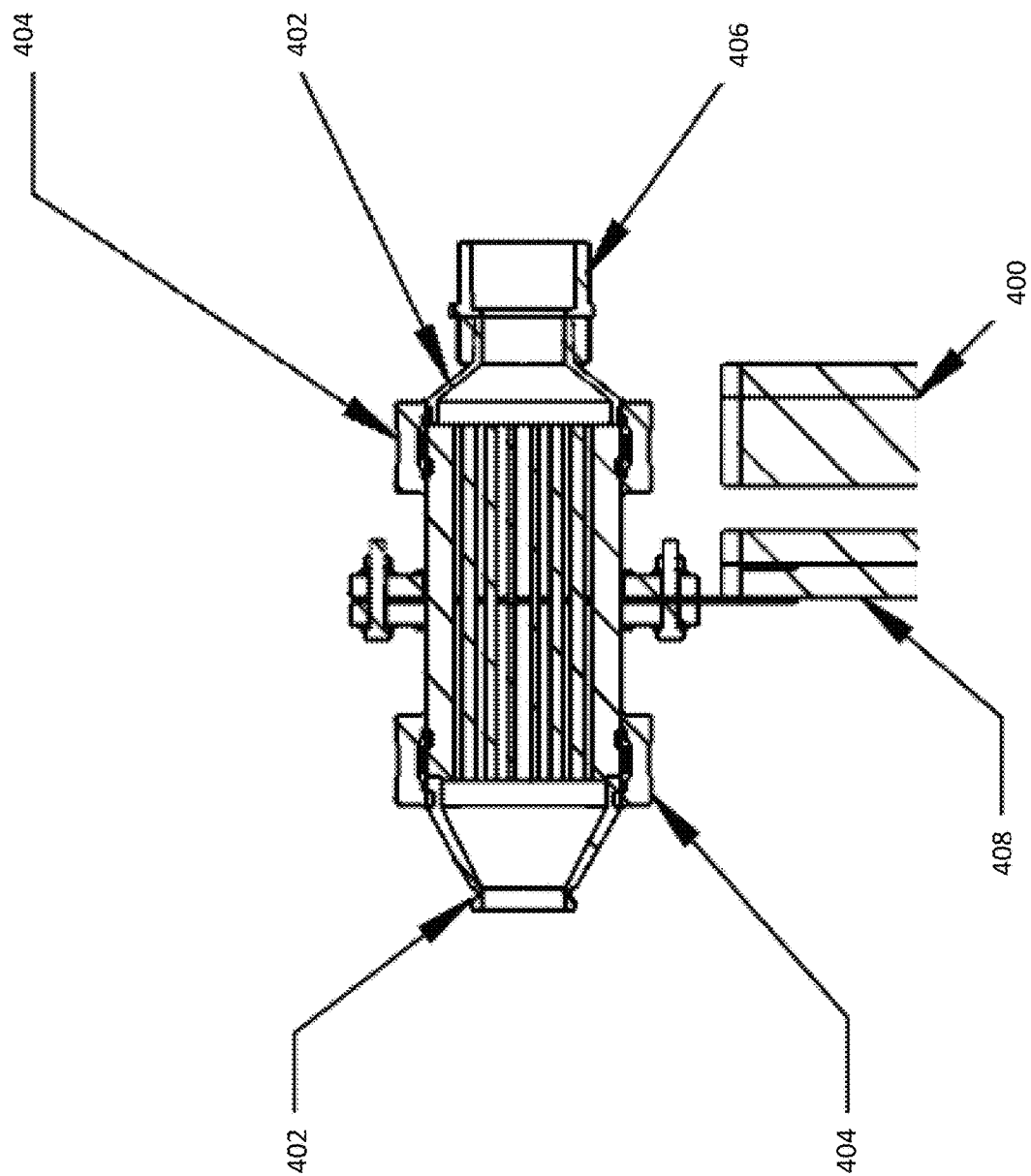
FIG. 4 is an assembled view of a Hydronic Waveguide and attachment adaptor fittings to connect to a wall consistent with certain embodiments of the present invention.

Turning now to FIG. 4, this figure presents an assembled view of a Hydronic Waveguide and attachment adaptor fittings to connect to a wall consistent with certain embodiments of the present invention. In an exemplary embodiment, the Hydronic Waveguide presents a 4-inch-wide channel through a wall 400 that connects liquid bearing pipes while preventing the passage of RF and EMI radiation. Typical pipes are 2 inches in diameter which requires expansion and reduction fittings to complete the installation and operation of the Hydronic Waveguide. In this figure a 2-inch pipe on the unshielded side of a wall, where the pipe may be made of any material to carry liquids, is connected to a groove pipe adaptor fitting 402 that connects the pipe to a steel groove pipe clamp and gasket 404, which also provides for connection to an expansion fitting as previously described. After passing through the shield boundary 408 the Hydronic Waveguide inside the shield wall is connected to a PVC adaptor fitting 406 through a second steel groove pipe clamp and gasket 404 and a second pipe adaptor fitting 402 to complete the passage for liquids from pipes on the non-shielded side of a wall to a shielded side of a wall.

Figure 5:
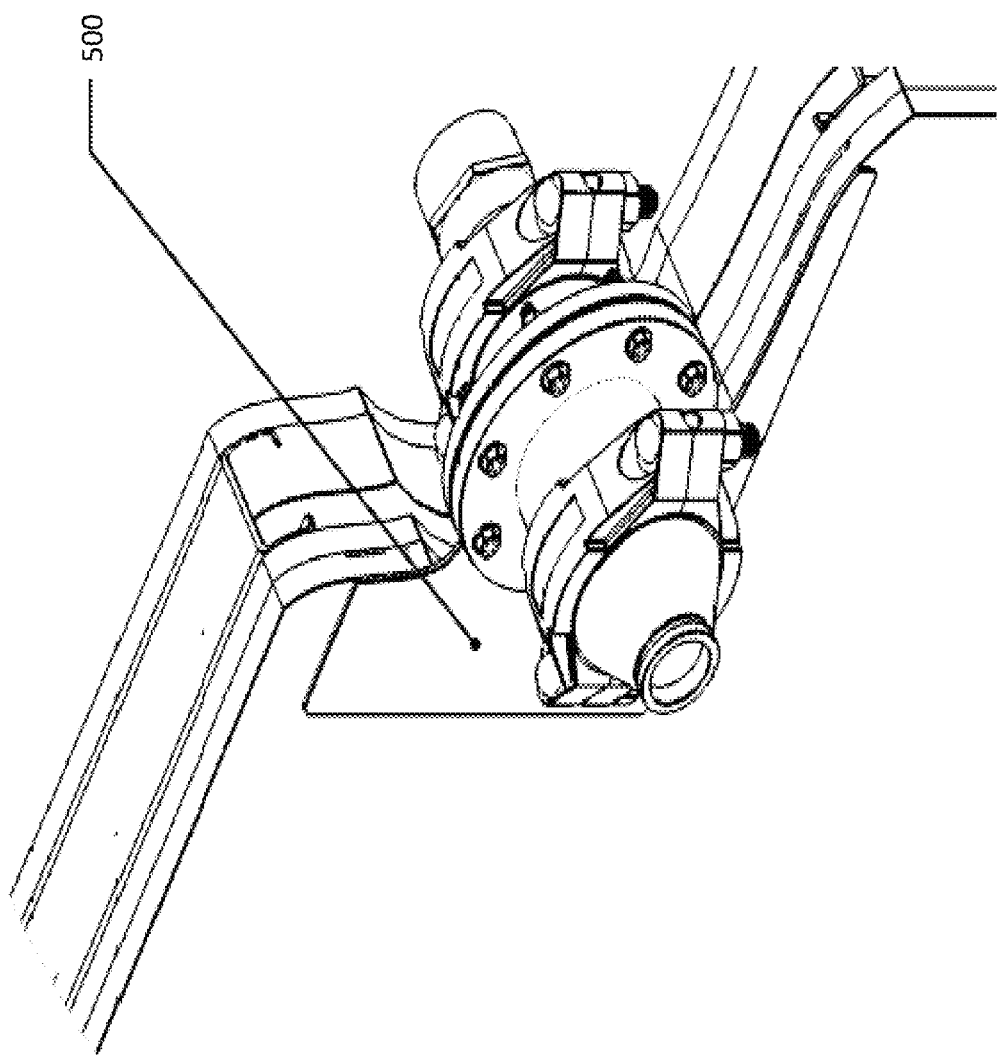
FIG. 5 is a perspective view of the fully assembled hydronic wave guided mounted to a shielding perimeter wall as installed consistent with certain embodiments of the present invention.

Turning now to FIG. 5, this figure presents a perspective view of a fully assembled hydronic waveguide mounted to a shielded perimeter wall 500 as installed consistent with certain embodiments of the present invention.

While certain illustrative embodiments have been described, it is evident that many alternatives, modifications, permutations and variations will become apparent to those skilled in the art in light of the foregoing description.

We claim:
1. A hydronic waveguide shield apparatus, comprising:
   a hollow central body having a grooved attachment point at a proximal end and a distal end;
   a mounting ring and radio frequency gasket;
   a supporting ring;
   a clamp associated with said grooved attachment point of the proximal end and a clamp associated with said grooved attachment point of the distal end;
   a plurality of fastening bolts and fastening nuts;
   said hollow central body configured to pass through an enclosure shield wall shielded against electromagnetic interference and radio frequency signals;
   the mounting ring and radio frequency gasket configured to attach to said hollow central body at said proximal end and being placed against an unshielded environment side of the shield wall;
   the support ring configured to attach to said hollow central body at said distal end and being placed against a shielded side of said shield wall;
   said fastening bolts and fastening nuts configured to pass through the mounting ring and radio frequency gasket and the supporting ring so as to affix the hollow central body to the shield wall forming a passageway through said shield wall;
   where, once affixed to the shield wall, the hollow central body permits the passage of fluids from the unshielded environment side of said shield wall to the shielded side of said shield wall while mitigating the penetration or interference of electromagnetic interference or radio frequence signals through the shield wall.

2. The hydronic waveguide shield apparatus of claim 1, where said clamp associated with said proximal grooved attachment point is connected to a first steel pipe reduction element located on the unshielded side of said shield wall.

3. The hydronic waveguide shield apparatus of claim 2, further comprising said first steel pipe reduction element connecting a hollow body proximal portion to a smaller diameter pipe.

4. The hydronic waveguide shield The apparatus of claim 1, where said clamp associated with said grooved attachment point of the distal end is connected to a second steel pipe reduction element located on the shielded side of said shield wall.

5. The hydronic waveguide shield The apparatus of claim 4, further comprising said second steel pipe reduction element connecting a hollow body distal portion to a smaller diameter pipe.

6. The hydronic waveguide shield The apparatus of claim 1, where said supporting ring is configured for multiple-bolt mounting patterns where said mounting patterns facilitate mounting in different environments.

7. The hydronic waveguide shield The apparatus of claim 1, where the hydronic waveguide is configured to provide passage though said shield wall to liquids at pressures up to 200 pounds per square inch.

8. The hydronic waveguide shield The apparatus of claim 1, where the hydronic waveguide is configured to maintain a 60 dB sound shielding effectiveness and up to 10 GHz frequency shield effectiveness.

* * * * *